United States Patent [19]

Sakow et al.

[11] 4,435,835
[45] Mar. 6, 1984

[54] METHOD AND DEVICE FOR DETECTING THE POSITION OF AN OBJECT

[75] Inventors: Hiroshi Sakow; Seiji Kashioka, both of Hachiouji, Japan

[73] Assignee: Hitachi, Ltd., Tokyo, Japan

[21] Appl. No.: 247,073

[22] Filed: Mar. 24, 1981

[30] Foreign Application Priority Data

Mar. 24, 1980 [JP] Japan .................................. 55-36070

[51] Int. Cl.³ .............................................. G06K 9/32
[52] U.S. Cl. ....................................... 382/8; 358/101; 364/490; 364/559; 382/34; 382/48
[58] Field of Search ............ 340/146.3 MA, 146.3 H; 358/101, 107; 356/373, 375; 364/449, 460, 474, 515, 490, 559; 382/8, 33, 34, 44, 45, 48

[56] References Cited

U.S. PATENT DOCUMENTS

| | | | |
|---|---|---|---|
| 3,898,617 | 8/1975 | Kashioka et al. | 340/146.3 MA |
| 4,014,000 | 3/1977 | Uno et al. | 340/146.3 MA |
| 4,021,778 | 5/1977 | Ueda et al. | 340/146.3 MA |
| 4,091,394 | 5/1978 | Kashioka et al. | 340/146.3 H |
| 4,238,780 | 12/1980 | Doemens | 340/146.3 H |
| 4,242,662 | 12/1980 | Tsujiyama et al. | 340/146.3 MA |
| 4,300,122 | 11/1981 | McMahon | 340/146.3 H |

*Primary Examiner*—Leo H. Boudreau
*Attorney, Agent, or Firm*—Antonelli, Terry & Wands

[57] ABSTRACT

A position detecting method is disclosed wherein the position of an object is detected by the use of pattern information which are taken from an observational region on the object contained within a whole region. Positional information of at least one of standard pattern is extracted from a pattern of the whole region are stored in advance; positional information of the standard pattern are extracted from the pattern taken from the observational region on the object; and the positional information of the standard pattern in the whole region and the observational region are compared, to decide which part of the whole region the observational region is and to detect the position of the object.

4 Claims, 13 Drawing Figures

FIG. 11

|   | I=1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| J=1 |  |  |  |  |  |  |  |  |  |  |  |  |  | 1 |  |  |  |  |
| 2 |  |  |  |  |  |  |  |  |  | 1 |  |  |  |  |  |  |  |  |
| 3 |  |  |  |  | 1 |  |  |  |  |  |  |  | 4 |  |  |  |  |  |
| 4 | 3 |  |  |  | 4 | 3 |  |  |  |  |  | 1 |  |  |  |  | 1 |  |
| 5 | 1 |  |  |  | 2 |  | 1 |  |  |  |  | 3 |  |  |  |  |  |  |
| 6 |  |  |  |  |  |  |  |  |  |  |  |  |  |  |  | 1 |  |  |
| 7 |  |  |  |  |  |  |  |  | 1A1 |  |  |  |  |  |  |  |  | 4 |
| 8 |  |  |  |  |  | 1A2 |  |  |  |  |  |  |  |  |  |  |  |  |
| 9 | 3 |  |  |  | 4A3 | 3A4 |  | 4A5 | 3A6 | 4A7 |  |  |  | 3 | 4 | 3 | 4 |  |
| 10 | 1 |  |  |  | 2A8 | 1A9 |  |  |  | 2A10 | 1A11 |  |  |  | 2 | 1 |  |  |
| 11 |  |  |  |  |  |  |  |  |  |  |  |  |  |  |  |  |  |  |
| 12 |  |  |  |  |  |  |  |  |  |  |  |  |  |  |  |  |  |  |
| 13 |  |  |  |  |  |  |  |  |  |  |  |  |  |  |  |  |  |  |
| 14 | 3 |  |  |  | 4 | 3 |  |  |  | 4 | 3 |  |  | 4 | 3 |  |  |  |

FIG. 12

|   | i=1 | 2 | 3 | 4 | 5 | 6 | 7 | 8 | 9 |
|---|---|---|---|---|---|---|---|---|---|
| j=1 |  |  |  |  |  | 1a1 |  |  |  |
| 2 |  | 1a2 |  |  |  |  |  |  |  |
| 3 |  | 4a3 | 3a4 |  | 4a5 | 3a6 | 4a7 |  |  |
| 4 |  | 2a8 | 1a9 |  |  | 2a10 | 1a11 |  |  |
| 5 |  |  |  |  |  |  |  |  |  |
| 6 |  |  |  |  |  |  |  |  |  |
| 7 |  |  |  |  |  |  |  |  |  |

METHOD AND DEVICE FOR DETECTING THE POSITION OF AN OBJECT

BACKGROUND OF THE INVENTION

1. Field of the Invention

This invention relates to a position detecting method and device for detecting the position of an object by the use of an image pattern picked up by a television camera or the like.

2. Prior Art of the Invention

A method wherein from within an image pattern taken by a pickup device such as television camera, a certain objective pattern is extracted in a manner to be distinguished from any other pattern or a background pattern, and the position of the objective pattern within the two-dimensional image pattern is found, has heretofore been known as disclosed in, for example, the official gazette of Japanese Patent Application Publication No. 52-14112 and the official gazette of Japanese Patent Application Laying-open No. 52-9133.

This method senses the position of the objective pattern on an object in such a way that a local pattern on the object is used as a standard pattern, that the positional relationships between the standard pattern and the objective pattern are stored in advance, that partial patterns cut out at various positions within the image pattern of a pickup region as are applied by the pickup device are sequentially compared with the standard pattern, and that positional coordinates representative of the most coincident partial pattern are extracted.

With such method, however, the objective pattern is distinguished by finding the position of the local pattern which is the most coincident with the standard pattern within the image pattern of the pickup region, so that in case where a plurality of patterns having the same feature as that of the local pattern exist within the image pattern, only one of them is detected, it being impossible to detect the specified local pattern and to obtain the objective pattern.

In order to make it possible to reliably detect only the specified local pattern even when a plurality of patterns having the same feature as that of the local pattern exist within the image pattern, the following method has been proposed.

The pickup region is divided into a plurality of sections, the positional coordinates of the partial patterns in which the degrees of coincidence between the local patterns cut out and the standard pattern become the maximum are evaluated in the respective sections, the degrees of coincidence not smaller than a predetermined value are extracted, and the positional coordinates of the objective pattern are detected from the relative positional relationships among the plurality of positional coordinates of the partial patterns thus extracted.

With these prior-art methods, however, it is the necessary condition that the objective pattern or the local pattern for detecting the inherent positional relationship exists within the pickup region at the time of detection, and when this condition is not fulfilled, the pickup device or the object needs to be moved. Further, in case where in the positional detection of a pattern on a semiconductor pellet or the like, the image magnifications have been increased on account of the promoted minuteness of the pattern of the object or to the end of enhancing the recognition accuracy, the pickup region contracts relatively to an identical supply deviation, and it becomes less likely that the aforecited condition will be met.

SUMMARY OF THE INVENTION

An object of this invention is to provide a position detecting method which makes it possible to detect the supplied position of an object without moving a pickup device or the object regardless of the supply deviation the object may involve.

In order to accomplish such object, according to this invention, positional coordinates of one or several types of standard patterns, which is/are extracted from a pattern of a whole region set so as to include a pickup region of an object at all supposed supplied positions of the object are stored in advance, positional coordinates of the standard pattern are similarly extracted from an image pattern of the pickup region on the object, and the positional information of the standard pattern in the whole region and the pickup region are compared, to decide which part of the whole region the pickup region lies in, whereby the position of the object is detected.

Hereunder, embodiments of this invention will be described in detail with reference to the drawings.

BRIEF DESCRIPTION OF THE DRAWINGS

FIG. 11 is a diagram showing examples of standard patterns existent in the respective sections of the pattern of FIG. 5, FIG. 12 is a diagram showing examples of the standard patterns existent in the respective sections of the pattern of FIG. 7.

DETAILED DESCRIPTION OF THE INVENTION

Figure 1:
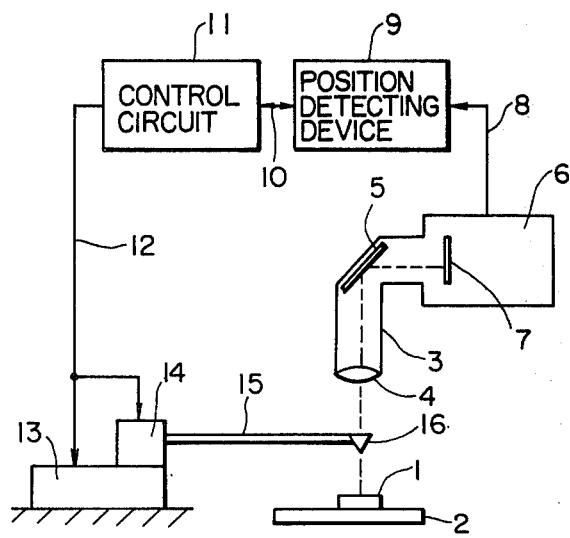
FIG. 1 is a constructional view of an example of an automatic wire bonding system which includes a position detecting device according to this invention.

FIG. 1 shows the construction of an automatic wire bonding system which bonds wires onto a semiconductor pellet by the use of a position detecting method according to this invention.

Referring to the figure, when a semiconductor pellet 1 has been supplied by a moving device 2, its image is projected onto a target 7 in a pickup device 6 through the objective lens 4 of a microscope 3 and via a mirror 5. As will be described later, a video signal 8 produced in the pickup device 6 enters a position detecting device 9 according to this invention, in which a video processing is performed to provide a signal 10 representative of the positional coordinates of an objective pattern on the object. The positional coordinate signal 10 is applied to a control circuit 11, from which a control signal 12 for a mechanism operation is provided at a suitable time to be fed to an X-Y servomechanism 13 and a wire bonding mechanism 14 carried thereon. Thus, the X-Y servomechanism 13 is actuated, and the wire bonding mechanism 14 is moved to a predetermined position. The bonding mechanism 14 is provided with an arm 15 which has a capillary 16 at its front end. Owing to the movement, the capillary 16 is moved to a position opposing to a desired position on the semiconductor pellet 1, and the bonding onto the semiconductor pellet 1 is executed on the basis of the control signal 12 from the control circuit 11.

The control circuit 11 is constructed of a processing device such as electronic computer.

Figure 2:
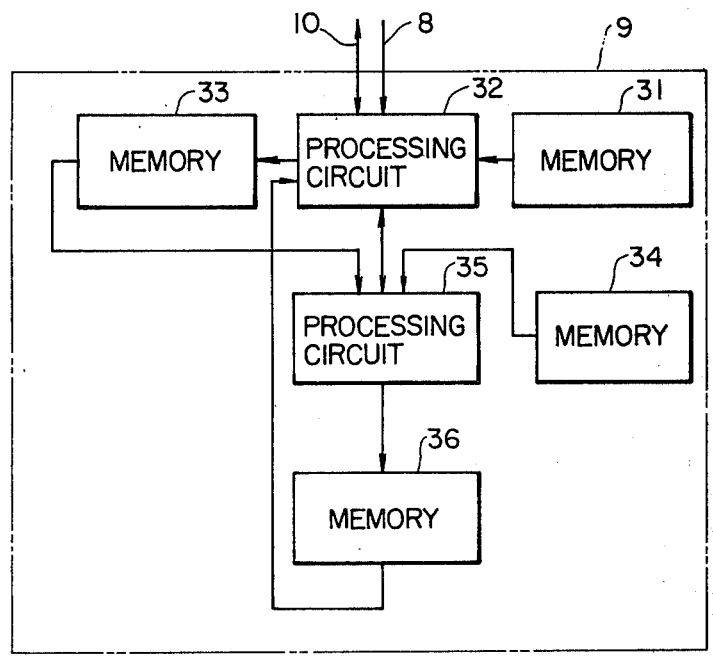
FIG. 2 is a block diagram of an embodiment of the position detecting device in FIG. 1.

FIG. 2 shows the construction of an embodiment of the position detecting device 9 according to this invention in FIG. 1.

Referring to the figure, the video signal 8 from the pickup device 6 is processed with reference to standard patterns stored in a memory 31 in advance, by means of a processing circuit 32 which is started by a start signal from the control circuit 11.

The processing by the processing circuit 32 will be described.

Figure 3:
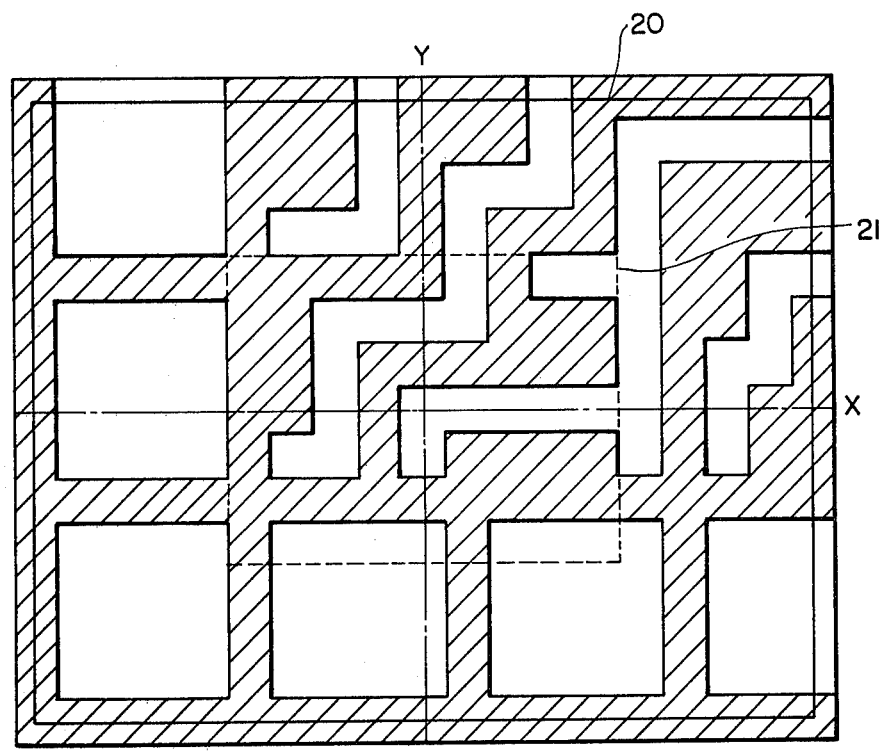
FIG. 3 is a diagram showing an example of the pattern of an object.

FIG. 3 shows an example of the pattern of the object such as the semiconductor pellet 1. The whole region 20 is so large that, even when a region to be picked up shifts in attendance on a supply deviation of the object, it is sufficiently covered. A region 21 is the region to-be-picked-up under the state under which no supply deviation exists.

Figure 4:
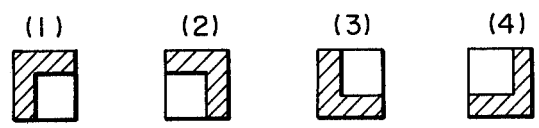
FIG. 4 is a diagram showing examples of standard patterns.

FIG. 4 shows examples of characteristic partial patterns in FIG. 3. These characteristic partial patterns are stored in the memory 31 as the standard patterns.

Figure 6:
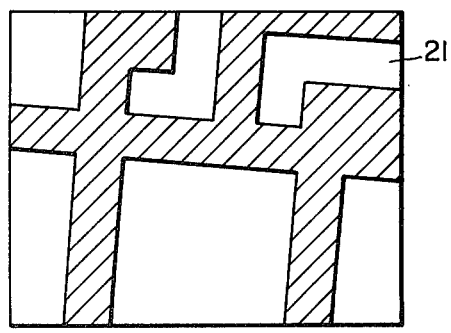
FIG. 6 is a diagram showing an example of that pattern of an object which is picked up at detection.

FIG. 6 shows an example of an image pattern within the pickup region 21 under a certain supply state of the object. This pattern is put into the position detecting device 9 as the video signal 8.

Figure 7:
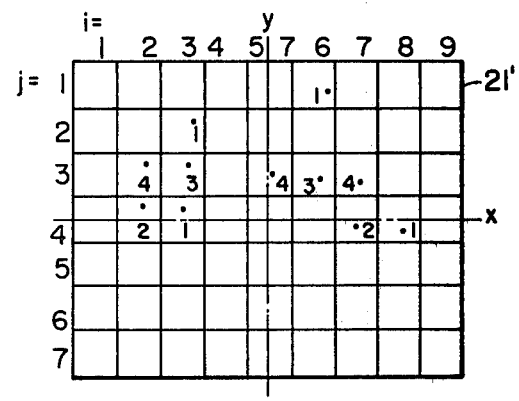
FIG. 7 is a diagram showing the positions of the standard patterns of FIG. 4 in the pattern of FIG. 6.

In the processing circuit 32, the pickup region 21 in FIG. 6 is divided into a plurality of sections in each of horizontal and vertical directions, i.e., x-axial and y-axial directions as illustrated in FIG. 7, and the presence of the standard patterns shown in FIG. 4 is detected in each of the sections. The detected results are indicated in FIG. 7.

Numerals 1-4 in FIG. 7 correspond respectively to the standard patterns (1)-(4) in FIG. 4.

The results thus obtained in the processing circuit 32 are stored in a memory 33 in the forms of the types of the standard patterns, the x and y positional coordinates thereof, and the coordinates (i, j) of the sections where the standard patterns exist.

Figure 5:
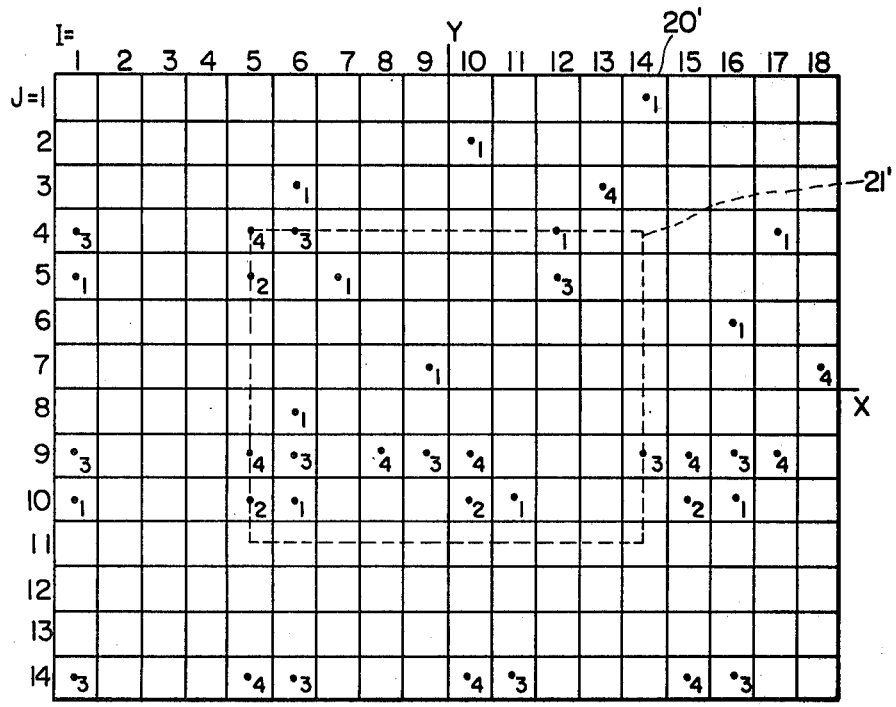
FIG. 5 is a diagram showing the positions of the standard patterns of FIG. 4 in the pattern of FIG. 3.

Results obtained when the whole region 20 of the pattern shown in FIG. 3 has been divided into a plurality of sections in each of X- and Y-axial directions and when the positional coordinates of the standard patterns (1)-(4) in FIG. 4 have been detected in each of the sections in advance are as shown in FIG. 5.

In this invention, the positional information indicated in FIG. 5 are stored in a memory 34 in the same forms as in the memory 33, that is, in the forms of the types of the standard patterns, the X and Y positional coordinates thereof, and the coordinates (I, J) of the sections where the standard patterns exist. Regions 20' and 21' in FIG. 5 correspond to the regions 20 and 21 in FIG. 3, respectively.

In a processing circuit 35 in FIG. 2, that part in FIG. 5 which satisfies the positional relationship of the standard patterns indicated in FIG. 7 is detected, thereby to detect the supply position of the object. The result is stored in a memory 36. When the processing in the processing circuit 35 has ended, the content of the memory 36 is loaded into the processing circuit 32 and is delivered to the control circuit 11.

Now, the details of the processing in the processing circuit 32 will be described.

Figure 8:
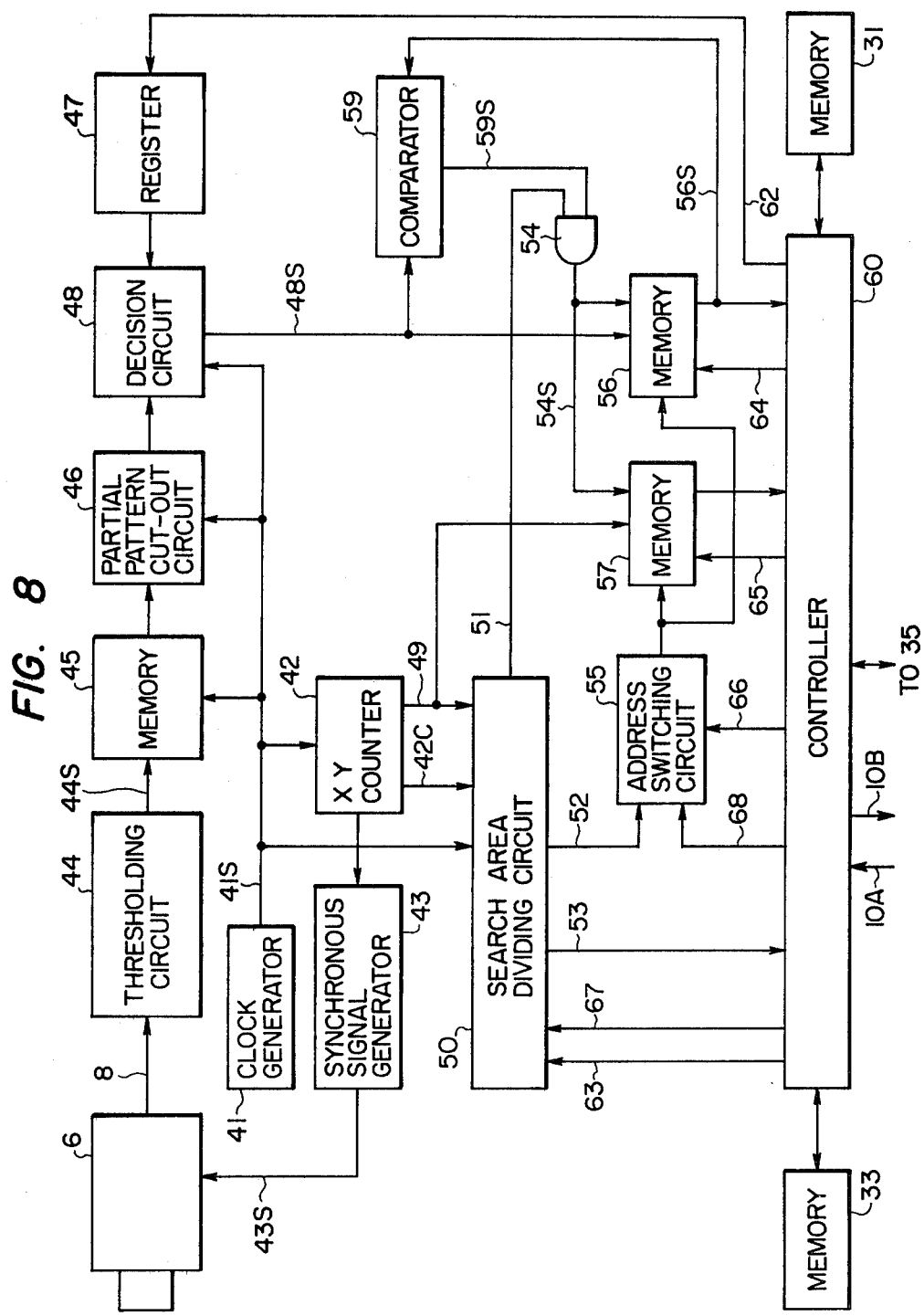
FIG. 8 is a block diagram of an embodiment of a processing circuit (32) in FIG. 2.

FIG. 8 shows an example of a specific arrangement of the processing circuit 32 in FIG. 2.

In the figure, numeral 6 designates the pickup device such as television camera shown in FIG. 2, and numeral 41 a clock generator. A clock signal 41S provided from the clock generator 41 is applied to an X-Y counter 42. The X-Y counter 42 consists of an X counter which counts the pulses of the clock signal 41S to obtain the X abscissa of the pickup field, and a Y counter which counts a carry signal 42C of the X counter to obtain the Y ordinate of the pickup field. Shown at numeral 43 is a synchronizing signal generator, which generates a synchronizing signal 43S necessary for the field scanning of the pickup device 6 on the basis of the count value of the X-Y counter 42.

The pickup device 6 raster-scans the image plane in synchronism with the synchronizing signal 43S and provides the video signal 8. This video signal 8 is converted by a threshold circuit 44 into a binary signal 44S which indicates whether the image of a picture element is "white" or "black", and which is supplied to an image memory 45.

The image memory 45 and a partial pattern cut-out circuit 46 can employ, for example, ones of the types disclosed in the specification of Japanese Patent Application Publication No. 46-14112.

More specifically, the image memory 45 consists of (n−1) shift registers which are connected in series with one another and which serve to temporarily store the binary picture information corresponding to the number of scanning lines, (n−1). Output signals of these registers correspond to n picture elements in the positional relation arrayed in the vertical direction on the pickup field. Accordingly, when the signals of the n picture elements are fetched from the image memory 45 in parallel, they are led to the partial pattern cut-out circuit 46 consisting of n shift registers each having a length of n bits and they are fetched as parallel information of n×n bits, then the partial patterns of the n×n picture elements corresponding to the scanning positions of the image are fetched in succession.

Numeral 47 indicates a register which serves to hold standard patterns to be compared with the partial patterns and consisting of information of n×n picture elements, and which stores therein the standard patterns selectively provided from the memory 31 in FIG. 2. The contents of the register 47 and the outputs of the partial pattern cut-out circuit 46 are compared at the respectively corresponding bits by a decision circuit 48, and the total number of bits at which the contents have coincided is provided as a signal 48S which indicates the degree of coincidence between the partial patterns and the standard patterns. Since the circuits 45, 46 and 48 operate in synchronism with the clock signal 41S, such coincidence signals 48S are successively provided in parallel with the scanning of the image plane.

Numeral 50 indicates a search area dividing circuit, which operates in synchronism with the clock signal 41S and which decides whether or not the present scanning point lies within the effective pickup region or search area, on the basis of the carry signal 42C of the X counter and X-Y coordinate signals 49 (49X, 49Y) as are provided from the X-Y counter 42. If the present scanning point lies within the search area, a coincidence comparison instruction signal 51 is provided. In addition, this circuit divides the search area into a plurality of sections and generates address signals 52 (52X, 52Y) indicating which section the scanning point belongs to. The address signals 52 are applied to a coincidence memory 56 and a coordinate memory 57 through an address switching circuit 55.

The coincidence memory 56 has memory areas corresponding to the address signals 52, and can store therein the maximum degrees of coincidence up to the present time between the partial patterns and the standard patterns at the respective sections corresponding to the addresses in the search area. More specifically, the contents of the addressed memory areas of the memory 56 are read out as signals 56S, and they are applied to a comparator 59 along with the coincidence signals 48S successively provided from the decision circuit 48. The comparator 59 provides a pulse signal 59S when the degree of coincidence 48S obtained anew is greater. The pulse signal 59S is applied to an AND gate 54 which is controlled "on" and "off" by the coincidence comparison instruction signal 51, and it is provided from the AND gate 54 during only the output period of the comparison instruction signal 51 and becomes a pulse 54S permitting the memories 56 and 57 to update the data. The coincidence memory 56 can accordingly store the new degree of coincidence given by the signal 48S in its memory area corresponding to the address signals 52 in response to the pulse signal 54S.

Likewise to the coincidence memory 56, the coordinate memory 57 has coordinate memory areas corresponding to the address signals 52 and stores the coordinate data 49 from the X-Y counter 42 in its addressed memory area when the pulse signal 54S is given.

Since the field scanning is performed in a manner to be repeated in the X direction while shifting the position in the Y direction, the address of the section within the search area changes successively in accordance with the field scanning. Upon end of the scanning of one picture field, accordingly, the maximum degrees of coincidence between the standard patterns and the partial patterns and the positional coordinates of the partial patterns concerning all the sections are respectively stored in the memories 56 and 57.

Numeral 60 designates a controller, which is a device having the function of the input/output of information, the sequence control, the numerical control, and the decision of data as, for example, an electronic computer. Upon receiving a start signal 10A from the external control circuit 11, the controller 60 starts control operations in accordance with procedures programed in advance. First, it reads out the necessary standard pattern from the memory 31 and transmits a pattern signal 62 thereof to the register 47, while it transmits such parameters as the dimensions $d_1$ and $d_2$ of the section in the X and Y directions, the numbers of divisions $n_1$ and $n_2$ in the X and Y directions, and the coordinates $X_s$ and $Y_s$ of the start point of the search area to the search area dividing circuit 50 as signals 63. Clear signals 64 and 65 are respectively applied to the coincidence memory 56 and the coordinate memory 57 to clear the contents thereof, whereupon a switching signal 66 is provided so as to permit the address switching circuit 55 to deliver the address from the search area dividing circuit 50.

When these pre-processing operations have ended, the controller 60 supplies the search area dividing circuit 50 with a start instruction signal 67 for a pattern detecting operation. Upon receiving the instruction signal 67, the search area dividing circuit 50 starts the operation for the pattern detection at the timing at which the field scanning of the pickup device 6 has returned to its initial position. Upon end of the scanning of one picture field, the circuit 50 provides an end signal 53 to inform the controller 60 of the end of the pattern detecting operation.

When the end signal 53 has been received, the controller 60 provides the switching signal 66 so that the address switching circuit 55 may become accessible to the memories 56 and 57 on the basis of an address signal 68 to be provided from the controller. Thus, the controller 60 successively reads out the degrees of coincidence of the respective sections stored in the coincidence memory 56 and decides whether or not they are at least equal to a predetermined value. If any of the degrees of coincidence is equal to or greater than the predetermined value, the coordinate values are read out from the coordinate memory 57, and they are written into the memory 33 on the controller side along with the information indicative of the sort of the standard pattern and the coordinates of the section corresponding to the address signal 68 at that time.

When the processings for one standard pattern have been completed in this way, the next standard pattern is read out from the memory 31 and the same operation as described above is repeated.

When the same operations have been carried out for all the standard patterns and all the processings have ended, a start signal to be stated later is transmitted to the processing circuit 35. When processings in the processing circuit 35 have ended, the processing circuit 32 loads the content of the memory 36 and transmits it to the control circuit 11 as a signal 10B in response to an end signal provided from the processing circuit 35.

Figure 9:
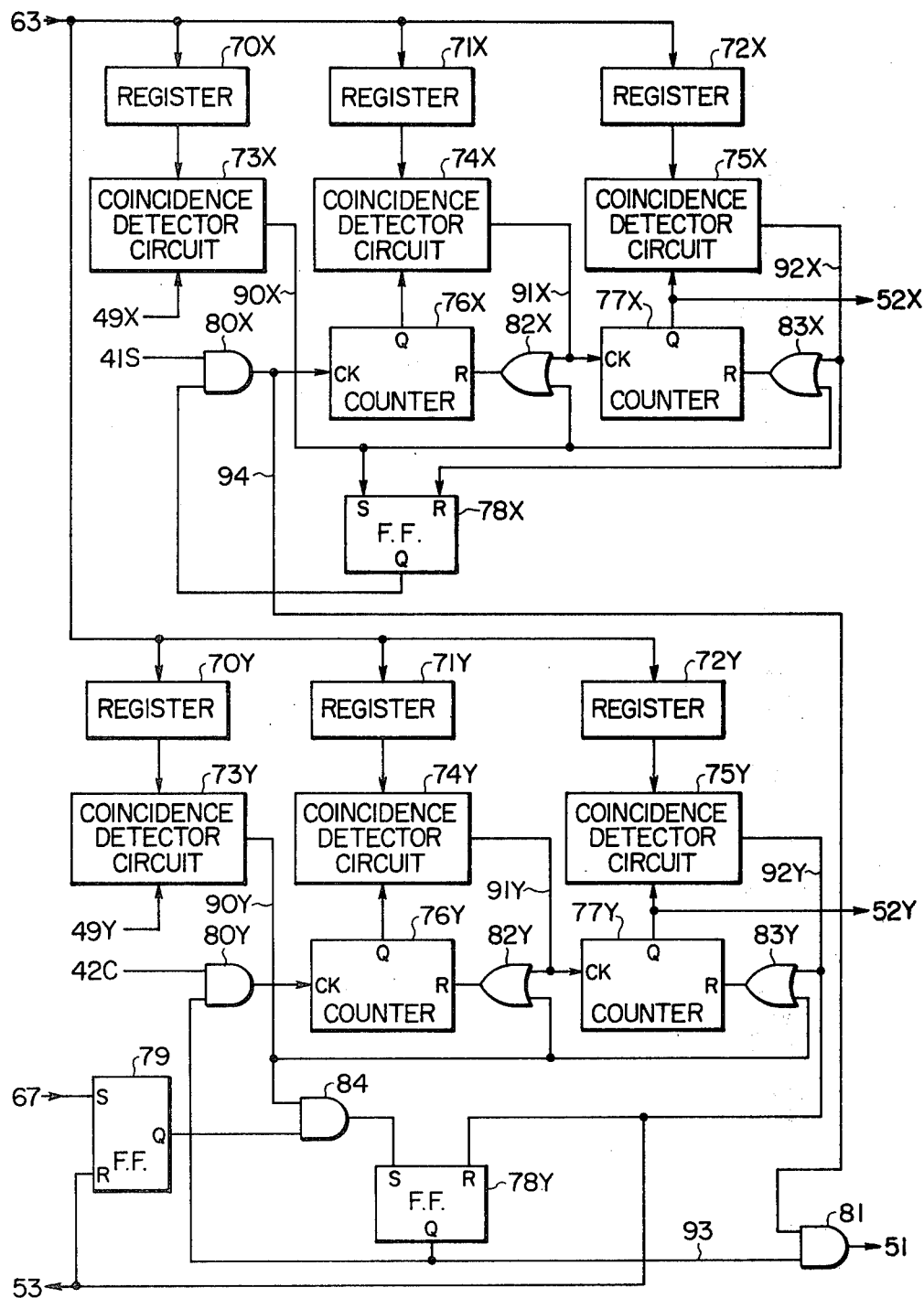
FIG. 9 is a block diagram of an embodiment of a search area dividing circuit in FIG. 8.

Now, the specific arrangement of the search area dividing circuit 50 will be described with reference to FIG. 9.

This circuit consists of an X address control portion and a Y address control portion. 70X and 70Y designate registers for holding the coordinates $X_s$ and $Y_s$ of the start point of the search, 71X and 71Y registers for holding the dimensions $d_2$ and $d_1$ of one divided section in the X direction and Y direction, and 72X and 72Y registers for holding the numbers $n_2$ and $n_1$ of sections in the X direction and Y direction, respectively. The parameters to be held in these registers are fed from the controller 60 as the signals 63. 73X, 73Y, 74X, 74Y, 75X and 75Y designate coincidence detector circuits; 76X, 76Y, 77X and 77Y counters; 78X, 78Y and 79 flip-flops; 80X, 80Y, 81 and 84 AND gates; and 82X, 82Y, 83X and 83Y OR gates.

First, the operation will be described from the X address control portion. The coincidence detector circuit 73X compares the X abscissa 49X of the scanning point provided from the coordinate counter 42 and the abscissa $X_s$ of the scanning point held in the register 70X, and provides a pulse signal 90X upon coincidence.

This pulse signal 90X sets the flip-flop 78X, and resets the values of the counters 76X and 77X to zero through the OR gates 82X and 83X respectively. When the flip-flop 78X has fallen into the set state, its output enables the AND gate 80X, and the fundamental clocks 41S are successively applied to the counter 76X, so that the counting operation is started.

The coincidence detector circuit 74X provides a pulse signal 91X when the value of the counter 76X has coincided with the lateral width $d_2$ of one divided section held in the register 71X. This pulse signal 91X is applied to the counter 77X to increment the count value by 1 (one), and is applied to the reset terminal of the counter 76X through the OR gate 82X. Accordingly, the counter 76X repeats the counting operation every count value equal to the lateral width of the divided section, and it increments the value of the counter 77X each time the scanning point transfers from one section to the next section in the X direction. The content of the counter 77X is a value indicating which of the sections in the lateral direction the scanning is being executed in, and this value is provided as the signal 52X indicating the X address of the section.

The coincidence detector circuit 75X compares the value of the counter 77X and the X-directional appointment No. $n_2$ of the section held in the register 72X, and provides a pulse signal 92X upon coincidence. The pulse signal 92X is applied through the OR gate 83X to the reset terminal of the counter 77X to return the value thereof to zero, and resets the flip-flop 78X to disable the AND gate 80X and to inhibit the input of the fundamental clocks 41S. Since these operations are repeated at the respective horizontal scanning lines, the signals 52X indicating the X addresses of the divided sections within the search area are repeatedly provided.

In the next place, the Y address control portion will be described. In the Y address control portion, when the instruction signal 67 for starting the detecting operation has been provided from the controller 60, the flip-flop 79 is set to enable the AND gate 84. The coincidence detector circuit 73Y compares the Y ordinate 49Y of the scanning point provided from the coordinate counter 42 and the ordinate $Y_s$ of the scanning point held in the register 70Y, and provides a pulse signal 90Y upon coincidence. This pulse signal 90Y resets the counters 76Y and 77Y through the OR gates 82Y and 83Y respectively, and it sets the flip-flop 78Y through the AND gate 84 if this AND gate is enabled. Thus, the AND gate 80Y is enabled, and the carry signals 42C each of which is provided from the coordinate counter 42 every horizontal scanning line are successively applied to the counter 76Y, so that the counting operation is started.

The coincidence detector circuit 76Y provides a pulse signal 91Y when the value of the counter 76Y has coincided with the vertical width $d_1$ of one divided section held in the register 71Y. This pulse signal is applied to the counter 77Y to increment the count value by 1 (one), and is applied through the OR gate 82Y to the reset terminal of the counter 76Y to reset the value thereof. Accordingly, the counter 76Y repeats the counting operation with a cycle being the count value equal to the vertical width of the divided section, and it causes the counter 77Y to execute the counting operation each time the scanning point transfers from one section to the next section in the Y direction. The content of the counter 77Y is a value indicating which of the sections in the vertical direction the scanning is proceeding in, and this value is provided as the signal 52Y indicating the Y address of the section. The signal 52Y is applied to the coincidence memory 56 and the coordinate memory 57 along with the signal 52X indicative of the X address.

The coincidence detector circuit 75Y compares the value of the counter 77Y and the vertical appointment No. $n_1$ of the section held in the register 72Y, and provides a pulse signal 92Y upon coincidence. This pulse signal 92Y resets the counter 77Y through the OR gate 83Y, and simultaneously resets the flip-flops 78Y and 79. The pulse signal is also transmitted to the controller 60 as the end signal 53 of the appointed pattern detecting processings.

Since the flip-flop 78Y lies in the "on" state during just one scanning period of the search area, the coincidence comparison instruction signal 51 is obtained by taking out from the AND gate 81 the AND output between the output signal 93 of the flip-flop 78Y and the output signal 94 of the AND gate 80X of the X address control portion.

Now, the details of the operation of the processing circuit 35 in FIG. 2 will be described.

Figure 10:
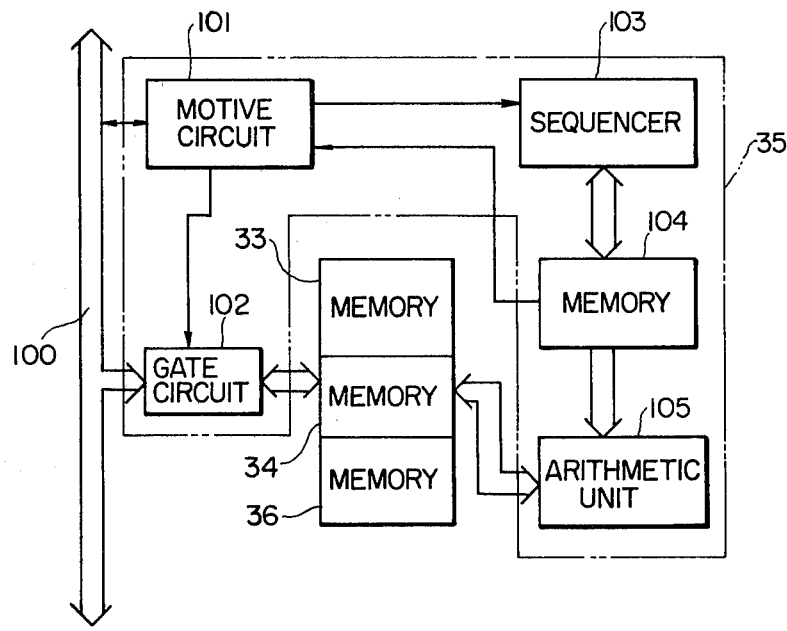
FIG. 10 is a block diagram of an embodiment of a processing circuit (35) in FIG. 2.

FIG. 10 shows an example of a specific arrangement of the processing circuit 35, in which numeral 100 designates a bus line for connecting the processing circuits 32 and 35 and the memory 33 in FIG. 2, numeral 101 designates a motive circuit, numeral 102 designates a gate circuit, numeral 103 designates a sequencer, numeral 104 designates a memory for storing microprograms therein, and numeral 105 designates an arithmetic unit (ALU).

In such construction, when the motive circuit 101 is supplied with the start signal through the bus line 100 upon end of the foregoing processings in the processing circuit 32, it enables the gate circuit 102 and disconnects the memories 33, 34 and 36 from the bus line 100. On the other hand, it starts the sequencer 103, by means of which the microprograms in the memory 104 are successively read out and transmitted to the arithmetic circuit 105. The arithmetic circuit 105 executes operations to be mentioned below in accordance with the microprograms from the memory 104 and by utilizing the contents of the memories 33 and 34, and stores the results in the memory 36.

Upon end of the processings in the arithmetic circuit 105, an end signal is transmitted from the memory 104 to the motive circuit 101, whereby the bus line 100 and the memories 33, 34 and 36 are connected by the gate circuit 102 again, while the processing circuit 32 is informed of the end of the processings in the processing circuit 35 through the bus line 100. Thus, the processing circuit 32 reads out the content of the memory 36 and transmits it to the control circuit 11 in FIG. 1.

There will now be described the details of the processings in the arithmetic unit 105.

As stated before, the memory 33 stores therein the types of the standard patterns detected from the pattern within the pickup region picked up by the pickup device 6 in FIG. 1, the x and y positional coordinates of the standard patterns, and the coordinates (i, j) of the sections where the standard patterns exist. In addition, the memory 34 stores therein the types of the standard patterns existing in the image pattern of the fixed area of the object, the fixed area including the pickup region even when this pickup region has moved due to any supply deviation involved; the X and Y positional coordinates of the standard patterns; and the coordinates (X, Y) of the sections where the standard patterns exist.

In the arithmetic unit 105, accordingly, after reading out the contents of these memories 33 and 34, the positional coordinates (i, j) of the sections and the types of the standard patterns existent in the sections as are stored in the memory 33 are compared with the positional coordinates (I, J) of the sections and the types of the standard patterns existent in the sections as are stored in the memory 34. FIGS. 11 and 12 represent the types of the standard patterns existing in the sections of the predetermined areas, and correspond respectively to FIGS. 5 and 7. Nos. within the sections in these figures denote the sorts of the standard patterns existent in the particular sections, and correspond to (1)-(4) in FIG. 4.

In comparing the contents of the memories 33 and 34, the positional coordinates (i, j)=(1-9, 1-7) of the sections in FIG. 12 are compared with the positional coordinates (I, J)=(1-9, 1-7) of the sections in FIG. 11, and the number in which the same standard patterns exist in the corresponding sections, in other words, the number in which Nos. in the corresponding sections coincide is counted. Subsequently, the aforecited positional coordinates in FIg. 12 are compared with positional coordinates (I, J)=(2-10, 1-7) shifting one section rightwards in FIG. 11, and the number in which Nos. in the corresponding sections coincide is counted. In this manner, the pickup region in FIG. 12 is successively translated on the region in FIG. 11, and the numbers above stated are counted. When, in due course, the sectional coordinates (i, j)=(1-9, 1-7) in FIG. 12 have been finally compared with the sectional coordinates (I, J)=(10-18, 8-14) in FIG. 11, the coincident sections in that position of the pickup region in which the count value of coincidence becomes the maximum value are found.

In the example of FIGS. 11 and 12, sections $A_i$ in FIG. 11 and sections $a_i$ in FIG. 12 (where i=1-11) are the coincident sections, and the number of the coincident sections becomes the maximum in a sectional region which includes the above sections, that is, in a sectional region whose head sectional coordinates (i, j) and (I, J) are (1, 1) and (4, 7).

The x and y coordinates and X and Y coordinates of the coincident standard patterns in the coincident sections $A_i$ and $a_i$ (i=1-11) thus obtained are respectively fetched from the memories 33 and 34. Here, let the positional coordinates of the standard patterns in the sections $A_i$ and $a_i$ be $(x_i, y_i)$ and $(X_i, Y_i)$ respectively (i=1-11).

In the memory 34, the coordinates $(X_a, Y_a)$ of a predetermined specific position desired to evaluate the magnitudes of the supply deviation are stored besides the aforecited information. The coordinates $(X_a, Y_a)$ are read out from the memory 34.

The magnitudes of the supply deviation $(U_a, V_a)$ in the X and Y directions at the specific positional coordinates $(X_a, Y_a)$ are evaluated by executing the following operations by the use of two sets of positional information $(x_k, y_k)$ and $(X_k, Y_k)$, and $(x_j, y_j)$ and $(X_j, Y_j)$ (where k≠j) among the foregoing positional information $(x_i, y_i)$ and $(X_i, Y_i)$:

$$U_a = x_a - X_a$$

$$V_a = y_a - Y_a$$

where

-continued $$x_a = K_1(x_k - x_j) - K_2(y_k - y_j) + x_j$$

$$y_a = K_2(x_k - x_j) - K_1(y_k - y_j) + y_j$$

$$K_1 = \frac{(X_a - X_j)(X_k - X_j) + (Y_a - Y_j)(Y_k - Y_j)}{(X_k - X_j)^2 + (Y_k - Y_j)^2}$$

$$K_2 = \frac{(Y_a - Y_j)(X_k - X_j) - (X_a - X_j)(Y_k - Y_j)}{(X_k - X_j)^2 + (Y_k - Y_j)^2}$$

The magnitudes of the supply deviation $(U_a, V_a)$ thus evaluated are stored in the memory 36.

Figure 13:
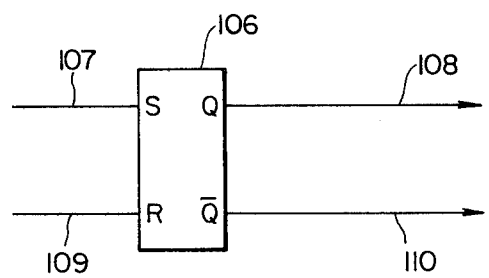
FIG. 13 is a block diagram of an embodiment of a motive circuit in FIG. 10.

FIG. 13 shows an example of a specific arrangement of the motive circuit 101 in FIG. 10. It is constructed of a flip-flop 106. This flip-flop 106 is set by a start signal 107 from the bus line 100, and its set output signal 108 disables the gate circuit 102 and starts the sequencer 103. On the other hand, the flip-flop 106 is reset by an end signal 109 transmitted from the memory 104 upon end of the operations in the arithmetic unit 105, its reset output signal 110 is transmitted to the bus line 100, and the gate circuit 102 is enabled by the set output signal 108.

While, in the foregoing example, the case of the four sorts of standard patterns has been explained, this invention is not restricted thereto. It is also allowed that there is only one sort of standard pattern.

In the foregoing example, as illustrated in FIGS. 5 and 7, each of the patterns of the region previously set on the object and the pickup region of the object has been divided into the plurality of sections, and the types and positional coordinates of the standard patterns included in the respective sections have been detected. It is also allowed, however, to adopt a measure wherein without dividing the patterns into such sections, the sorts and positional coordinates of standard patterns on the patterns are detected, and the positional coordinates of the standard patterns on a preset region and a pickup region are compared with each other, thereby to determine the position of the pickup region on the preset region and to evaluate the magnitudes of the supply deviation of the object.

In this case, there may well be adopted a measure wherein the positional coordinates of the standard patterns on the set region are endowed with a fixed spread to set a standard-pattern existence region, and the existence region and the positional coordinates of the standard patterns on the pickup region are compared, whereby the angular supply deviation of the object can be coped with. It is also possible that a fixed spread is afforded to the positional coordinates of standard patterns on the pickup region or that a fixed spread is afforded to the positional coordinates of standard patterns of both the set region and the pickup region.

As set forth above, according to this invention, a region including a pickup region under all supposed supply states of an object is set, the positional information of standard patterns in the set region are stored in advance, and the information and the positional information of standard patterns in the pickup region are compared, whereby whatever supply deviation the object may have, the supplied position of the object can be detected without moving a pickup device or the object.

According to an embodiment of this invention, each of the set region and the pickup region is divided into a plurality of sections, and the presence or absence of the standard patterns in the corresponding sections is detected, whereby even when some angular supply deviation is involved in the object, it can be absorbed.

We claim:

1. A position detecting method for detecting the position of an object by scanning of the object with an image pickup device comprising:

storing in advance of scanning of the object positional information of at least one type of standard pattern which exists in a whole region including all pickup regions scanned by the image pickup device at respective supply deviations of the object, said whole region being composed of a plurality of said pickup regions;

scanning a pickup region by the image pickup device at a supply position of the object;

extracting positional information of the at least one standard pattern from the image obtained by the scanning of said pickup region; and comparing the positional information extracted from the scanned pickup region with positional information of the whole region stored in advance of the scanning of the object to determine which part of the whole region the said pickup region lies in and to detect the position of the object from positional relationship of said scanned pickup region within the whole region.

2. A position detecting method for detecting the position of an object by scanning of the object with an image pickup device comprising:

storing in advance of scanning of the object positional information of at least one type of standard pattern which exists in each of a plurality of sections within a whole region including every pickup region scanned by the image pickup device at respective supply deviations of the object, said whole region being composed of a plurality of said pickup regions;

scanning a pickup region by the image pickup device;

detecting the existence or nonexistence of the at least one standard pattern in each of sections of the scanned pickup region and extracting positional information of the standard pattern in said sections when it exists; and comparing the positional information of the at least one standard pattern within the respective sections in the whole region with the extracted positional information of the standard pattern in each of said sections of the scanned pickup region to determine which part of the whole region the scanned pickup region lies in and to detect the position of the object from positional relationships of the scanned pickup region within the whole region.

3. An object position detecting device comprising:

memory means to store positional information of at least one type of standard pattern which exists in a whole region including all pickup regions, said whole region being composed of a plurality of said pickup regions;

pickup means to scan a pickup region within the whole region, the whole region including every pickup region scanned by the pickup means at every supply state of an object; and detection means to extract positional information of the standard pattern from said pickup region scanned by the said pickup means and to compare the positional information stored in said memory means with said extracted positional information to determine which part of said whole region contains said scanned pickup region and to detect the position of said object.

4. An object position detecting device comprising:

memory means to store positional information of at least one type of standard pattern which exists in a whole region which is divided into a plurality of sections;

pickup means to scan a pickup region within the whole region wherein the whole region includes all pickup regions scanned by the pickup means at every supply state of an object, said whole region being composed of a plurality of said pickup regions; and means to detect the existence of the standard pattern within each of sections of the scanned pickup region and to extract positional information of said standard pattern in said whole region with the extracted positional information of the standard pattern in each of said sections of the scanned pickup region to detemine the part of said whole region the scanned pickup region lies within and to detect the position of said object from positional relationships of the standard pattern within the scanned pickup region of said whole region.

* * * * *